United States Patent
Jaffrey (10) Patent No.: US 10,273,774 B2
(45) Date of Patent: Apr. 30, 2019

(54) ASSEMBLY AND METHOD FOR MONITORING POSITION OF BLOWOUT PREVENTER RAMS

(71) Applicant: Cameron International Corporation, Houston, TX (US)

(72) Inventor: Andrew Jaffrey, Oldmeldrum (GB)

(73) Assignee: Cameron International Corporation, Houston, TX (US)

( * ) Notice: Subject to any disclaimer, the term of this patent is extended or adjusted under 35 U.S.C. 154(b) by 483 days.

(21) Appl. No.: 14/965,395

(22) Filed: Dec. 10, 2015

(65) Prior Publication Data
US 2017/0167220 A1   Jun. 15, 2017
US 2018/0087340 A9   Mar. 29, 2018

(51) Int. Cl.
*E21B 33/06* (2006.01)
*E21B 47/00* (2012.01)

(52) U.S. Cl.
CPC .......... *E21B 33/062* (2013.01); *E21B 47/00* (2013.01); *Y10T 137/8242* (2015.04)

(58) Field of Classification Search
CPC .... E21B 33/062; E21B 33/064; E21B 33/063; E21B 47/0001; E21B 47/00; F16K 37/0058; F16K 37/0041; Y10T 137/8242
USPC ................... 251/1.1, 1.3, 326–329; 137/554; 166/373
See application file for complete search history.

(56) References Cited

U.S. PATENT DOCUMENTS

| | | | |
|---|---|---|---|
| 4,922,423 A | 5/1990 | Koomey et al. | |
| 5,407,172 A * | 4/1995 | Young | E21B 33/062 137/554 |
| 6,321,846 B1 * | 11/2001 | Rytlewski | E21B 33/064 166/363 |
| 6,386,285 B1 * | 5/2002 | Heijnen | E21B 47/101 166/373 |
| 7,832,706 B2 * | 11/2010 | Judge | E21B 33/062 166/85.4 |
| 8,286,717 B2 * | 10/2012 | Giroux | E21B 47/122 166/208 |
| 2005/0087235 A1 * | 4/2005 | Skorpik | F16K 37/00 137/554 |
| 2006/0278281 A1 * | 12/2006 | Gynz-Rekowski | E21B 33/10 137/554 |
| 2007/0267221 A1 | 11/2007 | Giroux et al. | |

(Continued)

FOREIGN PATENT DOCUMENTS

EP         2604788 A2    6/2013

OTHER PUBLICATIONS

International Search Report and Written Opinion issued in corresponding application No. PCT/US2016/065363 dated Mar. 27, 2017, 15 pgs.

*Primary Examiner* — John Bastianelli
(74) *Attorney, Agent, or Firm* — Helene Raybaud (57) ABSTRACT

A blow out preventer ("BOP") includes a vertical bore extending through the body, a ram cavity intersecting the bore, and a port located below the ram cavity. A sensor assembly is locatable in the port and is configured to monitor the position of at least one opposing ram contained in the BOP. At least one of the rams includes a detection feature on a lower surface of the ram which is distinguishable from the rest of the ram body, other features of the BOP, and any debris in the bore of the BOP. The detection feature is detectable by the sensor assembly. The detection feature may include a visual indicator.

13 Claims, 5 Drawing Sheets

(56) References Cited

U.S. PATENT DOCUMENTS

| | | | | |
|---|---|---|---|---|
| 2007/0277974 | A1* | 12/2007 | DiFoggio | E21B 47/06 |
| | | | | 166/249 |
| 2008/0040070 | A1 | 2/2008 | McClanahan | |
| 2008/0264498 | A1* | 10/2008 | Thompson | F16K 3/246 |
| | | | | 137/554 |
| 2010/0152901 | A1* | 6/2010 | Judge | E21B 33/062 |
| | | | | 251/1.3 |
| 2012/0000646 | A1* | 1/2012 | Liotta | E21B 33/062 |
| | | | | 251/1.3 |
| 2012/0001101 | A1 | 1/2012 | Dietz et al. | |
| 2013/0146793 | A1* | 6/2013 | Gustafson | E21B 33/062 |
| | | | | 251/1.3 |
| 2013/0153212 | A1* | 6/2013 | Myers | E21B 40/00 |
| | | | | 251/1.1 |
| 2015/0000761 | A1* | 1/2015 | Jefferies | E21B 34/08 |
| | | | | 137/554 |

* cited by examiner

ASSEMBLY AND METHOD FOR MONITORING POSITION OF BLOWOUT PREVENTER RAMS

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

Drilling and production operations for the recovery of offshore deposits of crude oil and natural gas are taking place in deeper and deeper waters. Drilling and production operations in deeper waters are typically carried out from floating vessels rather than from stationary platforms resting on the ocean floor and commonly used in shallow water. According to conventional procedures, a vessel is dynamically stationed, or moored, above a well site on the ocean floor. After a wellhead has been established, a blowout preventer ("BOP") stack including one or more BOPs is mounted on the wellhead to control the pressure in the wellhead.

Typical BOPs are used as a large specialized valve or similar mechanical device that seal, control, and monitor oil and gas wells. The two most common categories of BOPs are ram BOPs and annular BOPs. BOP stacks frequently utilize both types of BOPs, typically with at least one annular BOP stacked above several ram BOPs. The ram units in ram BOPs allow for shearing drill pipe in the case of shear rams, sealing off around drill pipe in the case of pipe rams, and sealing the BOP bore in the case of blind rams. Typically, a BOP stack may be secured to a wellhead and may provide a safe means for sealing the well in the event of a system failure.

An example BOP includes a main body or housing with a vertical bore. Rain bonnet assemblies may be bolted to opposing sides of the main body using a number of high tensile fasteners, such as bolts or studs. These fasteners are required to hold the bonnet in position to enable the sealing arrangements to work effectively. An elastomeric sealing element may be used between the ram bonnet and the main body. There are several configurations, but essentially they are all directed to preventing a leakage bypass between the mating faces of the ram bonnet and the main body.

Each bonnet assembly includes a piston which is laterally movable within a ram cavity of the bonnet assembly by pressurized hydraulic fluid acting on the piston. The opposite side of each piston has a connecting rod attached thereto which in turn has a ram mounted thereon for extension into the vertical bore. The rams can be shear rams for shearing an object within the bore of a BOP. Alternatively, the rams can be pipe rams for sealing off around an object within the bore of a BOP, such as a pipe, thereby sealing the annular space between the object and the BOP bore. In addition, the rams can be blind rams for sealing the BOP bore.

The rams are designed to move laterally toward the vertical bore of the BOP to shear or seal off on any object located therein. For instance, opposing shear rams utilize cutting surfaces configured to close in on and shear an object located in the BOP bore, such as a section of drill pipe used during drilling operations. The opposing shear rams can include seals disposed adjacent the cutting faces of the shear rams and configured to come together to seal off the BOP bore.

Pipe rams utilize seals that close in on and seal off on a tubular within the vertical bore of the BOP. Each pipe ram typically has a semicircular opening in its front face to form a seal about half of the outer periphery of the object within the BOP vertical bore. When the opposing pipe rams are closed, the opposing pipe rams engage each other and seal the entire periphery of the object, thereby closing off the annulus between the object and the BOP bore. Typical pipe ram assemblies can include a ram packer which is composed of an elastomeric or rubber material configured to seal off against the tubular within the vertical bore of the BOP when the opposing rams are run into the closed position.

Still further, blind rams utilize seals that close in and seal on opposing blind ram seals to seal off a BOP bore when no object is present in the bore.

Each ram-type BOP within a BOP stack further includes one or more access ports (e.g., choke or kill ports) located below the associated ram cavities. The access ports are located on either side of the BOP body and are configured to provide a conduit for pumping fluid into or out of the wellbore while the associated rams are closed and in the event of a well kick. The fluid flow through the access port is handled by choke or kill lines, which can extend from the surface to the subsea BOP housing.

The access ports extend laterally through the BOP housing and are in fluid communication with the bore of the BOP. Typically, there are two access ports located within the BOP body and below the ram cavity of each BOP. In practice, only one access port located below a ram cavity is actively associated with a choke or kill line. The other access port under the particular ram cavity is generally unused during well operations.

Monitoring the opening and closing performance of rams is critical in understanding the ability of a BOP to close in on and seal off a BOP wellbore. Current methods for monitoring the position of the rams, for instance, during closing operations, includes monitoring the position of the piston driving the rams. By monitoring the position of the piston driving the ram, the general position of the ram can be estimated. Other methods include monitoring the amount of hydraulic fluid used to close a piston. Based on the volume of hydraulic fluid used, the displacement of the piston and ram can be estimated. However, other methods of monitoring the position of rams in a BOP are desirable. In particular, utilizing an existing but unused access port already located on a BOP housing (e.g., choke or kill port) to monitor the position of rams within a BOP is particularly desirable.

DESCRIPTION OF THE DRAWINGS

For a more detailed description of the embodiments, reference will now be made to the following accompanying drawings.

DETAILED DESCRIPTION OF THE EMBODIMENTS

Blowout preventers ("BOP") may be included at a wellhead when drilling or completing a well to close off the well to prevent a blowout. Such a blowout might occur, for example, when the well intersects a pocket of fluid under high pressure, which then blows up through the wellbore. A BOP closes to seal the well against the fluid pressure from below. A BOP can also be used to seal off the well around a pipe in the wellbore during drilling operations involving positive downhole pressure. In practice, multiple BOPs are arrayed in a vertical stack, which is positioned over the well, with the well piping or tubing extending up through the center of the BOP stack. BOPs can be used in conjunction with onshore and offshore drilling and completion operations. Each BOP typically comprises one or more choke or kill fluid ports located below the closing elements (e.g., rams) of the BOP. The choke or kill ports provide a conduit for pumping fluid into or out of the wellbore while the associated closing elements are closed in the event of a well kick.

Figure 1:
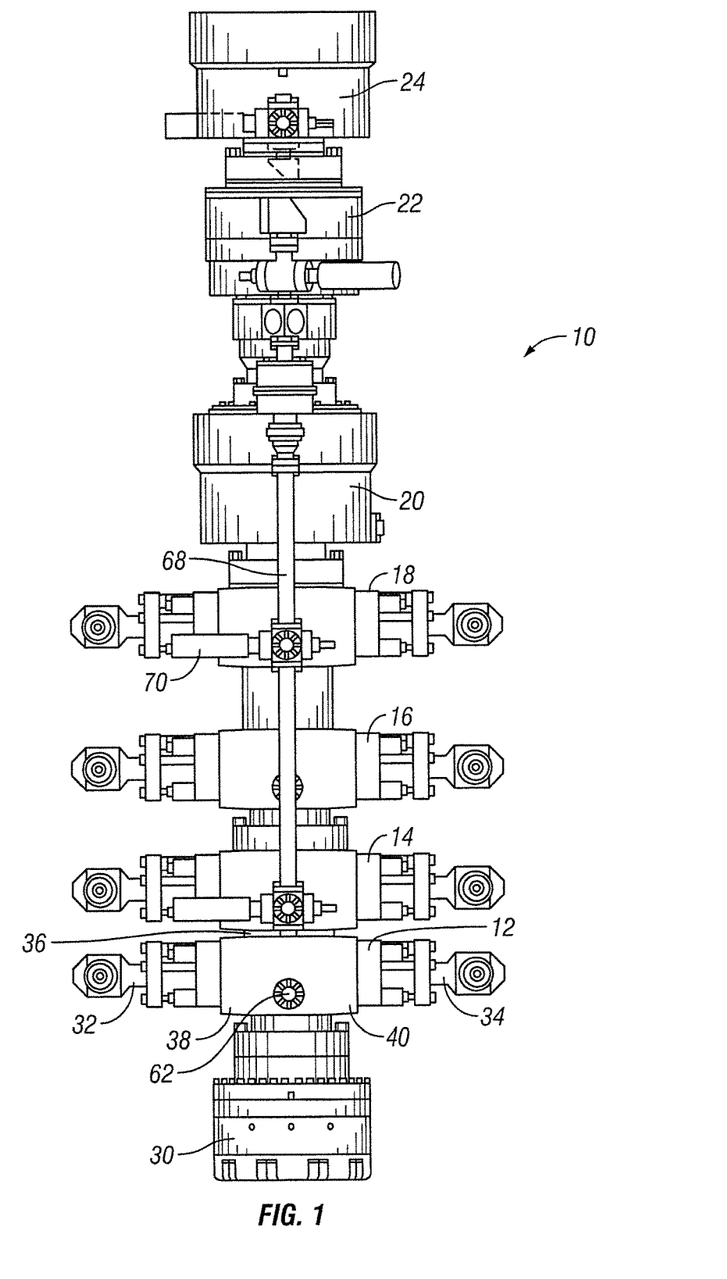
FIG. 1 shows a side elevation of a subsea blowout preventer stack.
Figure 2:
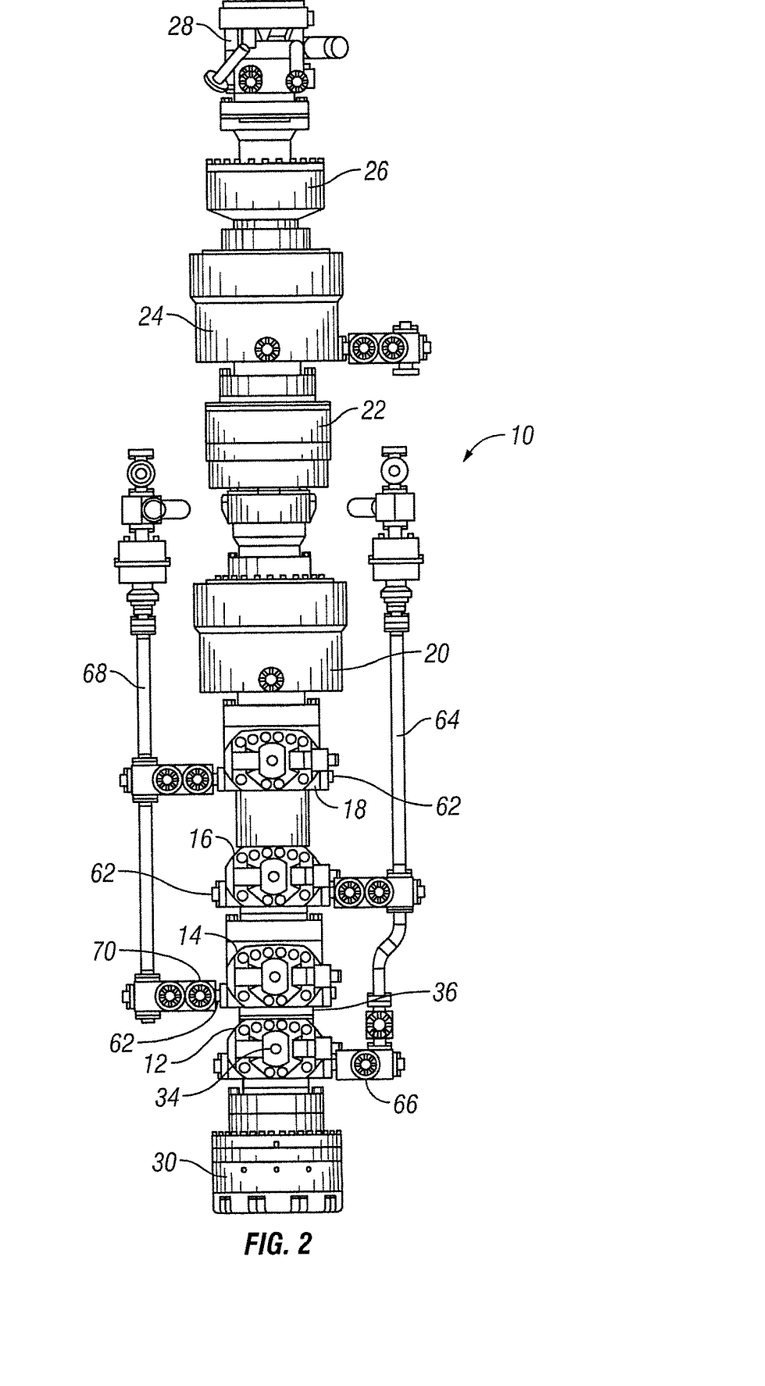
FIG. 2 shows another side elevation of the subsea blowout preventer stack of FIG. 1.

FIGS. 1 and 2 provide two views of a subsea BOP stack shown generally at 10. Various hydraulic lines, framework and control apparatuses for operating the BOP stack 10 are not shown for purposes of clarity. The stack 10 includes four ram-type BOPs 12, 14, 16 and 18 including various types of ram assemblies configured to close in on and central bore of the BOP stack 10. An annular BOP 20, a connector 22, a second annular BOP 24 and a flex joint 26 are arrayed above the ram-type BOPs 12-18. One or both of annular BOPs 20 and 24 can be located on the BOP stack, as shown. Alternatively, one or both of the annular BOPs 20 and 24 may be located on a lower marine riser package ("LMRP") positioned above and in fluid communication with the BOP stack 10. A riser adapter 28 is positioned at the top of the stack 10 for connection to a LMRP (not shown). A wellhead connector 30 is located at the bottom of the stack 10 for connection to a high pressure wellhead housing below (not shown). In general, the number and kind of BOPs in a stack, as well as the order in which they are arrayed in the stack, may vary depending on the needs of the end user.

A ram-type BOP includes a pair of linear drive devices, or linear actuators, located on opposite sides of a central housing to provide movement along a straight line, perpendicular to the vertical, toward and away from the housing. For example, a ram-type BOP, such as shown at 12, provides a pair of piston and cylinder assemblies 32 and 34 positioned on opposite sides of a central housing 36 positioned over the well. The pistons are movable along a line perpendicular to the vertical, that is, perpendicular to the wellbore at the surface of the well. As shown, the bottom two BOPs 12 and 14 have a common, extended central housing 36. Housing 36 is capable of have one, two, three, or more pairs of opposed rams positioned therein. A central vertical bore through the housing 36 is aligned with the wellbore so that well pipe extending from the well passes upwardly through the housing along its central bore.

The pistons are hydraulically operated to simultaneously move toward each other, or away from each other. Each piston carries a ram at the piston end toward the well, so that the two rams meet in a closed configuration or position at the housing central bore when the pistons are driven together, and are pulled apart by the pistons to an open configuration or position. The central vertical bores through housings of the ram-type BOPs 12-18 form part of a central vertical passageway extending from the wellhead and the wellbore below, up through all of the elements in the BOP stack 10 and on through the marine riser.

A cavity is provided within the central housing for each ram-type BOP 12-18, that is, for each pair of piston and cylinder combinations 32/34. Each cavity intersects the vertical bore of the housing 36 and extends radially outwardly toward the piston and cylinder structures 32 and 34 in two guideways 38 and 40, with each guideway interposed between the central housing 36 and a corresponding piston and cylinder assembly. The ram carried by a piston resides and moves within the corresponding guideway.

The rams in a multiple BOP stack, such as BOP stack 10, may operate in different ways in closing off the well. For instance, pipe rams seal around a tubular pipe extending from the well, closing off the annulus between the well pipe and the wellbore surface. Blind rams seal across the well with no pipe at the location of the blind ram. Shear, or cutting, rams shear the well pipe, but do not seal off the annulus around the pipe. Blind shear rams shear the well pipe and close and seal the well. A BOP with blind shear rams is typically positioned at the top of a ram-type BOP stack, with various pipe rams in BOPs located below. In a typical application, the top ram-type BOP 18 would be fitted with blind shear rams, and the lower preventers 12-16 would contain pipe rams.

Each of the ram-type BOPs 12-18 has an access port 62 located near the bottom of each side of the corresponding central housing 36 and below the associated ram cavity. The ports 62 of each BOP 12-18 are positioned to communicate with the central vertical passageway within the stack 10 at a location below where the ram packers of these BOPs would cooperate to form a seal. A choke line 64 extends along the side of the stack 10 and is capable of fluid communication with access ports 62 of the BOPs 12 and 16. Flow of fluid from choke line 64 to access ports 62 is controlled by valves 66. A choke line, such as choke line 64, can be used to bleed off high fluid pressure from the wellbore by tapping through access port 62 at a closed and sealed BOP. A kill line 68 extends along the opposite side of the stack 10 and is capable of fluid communication with access ports 62 of the remaining ram-type BOPs 14 and 18. Flow of fluid from kill line 68 to access ports 62 is controlled by valves 70. A kill line can be used to feed high-pressure fluid or high-density mud into the well through an access port 62 at a closed and sealed BOP. As more clearly illustrated in FIG. 2, only a single access port 62 is connected to a choke or kill line 64, 68 for each BOP.

Figure 3:
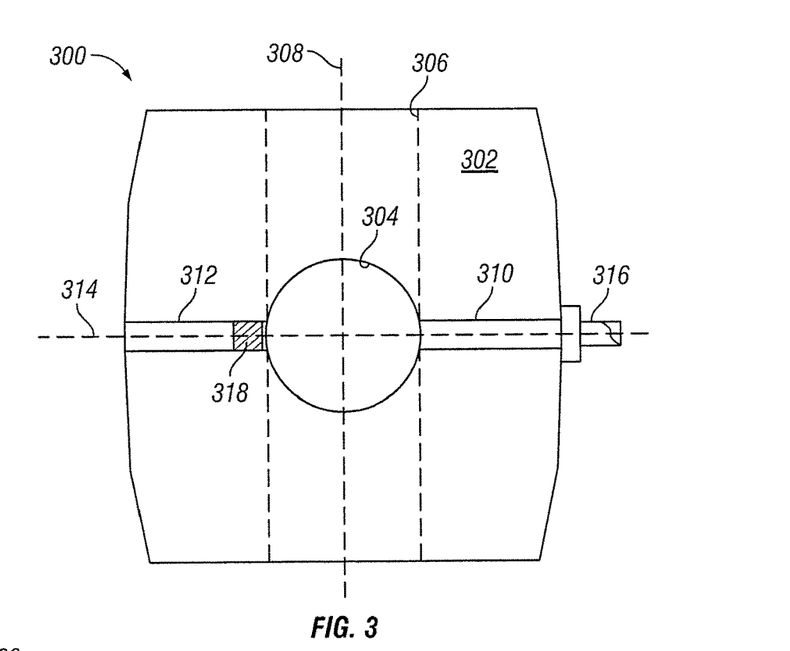
FIG. 3 shows a partial cross-sectional top view of a blowout preventer housing.

FIG. 3 illustrates a partial cross-sectional top view of a BOP 300 in accordance with one or more embodiments. The BOP 300 includes a generally hollow main housing or body 302 and a vertical bore 304 that enables passage of fluid and/or tubular members through the BOP 300. BOP 300 further includes a ram cavity 306 which extends across body 302. Rain cavity 306 provides a housing and guideway for rams (e.g., shear rams, pipe rams, blind rams, etc.) disposed in body 302 and includes axis 308. The rams are not shown in FIG. 3 for ease of viewing.

BOP 300 further includes access ports 310 and 312. Access ports 310 and 312 share an axis 314 which is perpendicular to ram cavity axis 308. Access port 310 is a choke or kill port and is in fluid communication with vertical bore 304. Access port 310 is further in fluid communication with fluid line 316 (e.g., choke or kill line). Fluid line 316 may be run from a surface or subsurface location and is configured to inject fluid into or withdraw fluid from vertical bore 304, for instance, in the event of a well kick. In this arrangement, fluid may travel from vertical bore 304, through access port 310, and through fluid line 316. Alternatively, fluid may travel from fluid line 316, through access port 310, and into vertical bore 304.

Access port 312 is structurally similar to access port 310. However, access port 312 is not associated with any fluid line, such as fluid line 316. Instead, access port 312 includes a sensor assembly 318 configured to monitor objects in vertical bore 304, namely the position of rams moving within vertical bore 304 or the conditions, such as temperature and pressure, within vertical bore 304.

Figure 4:
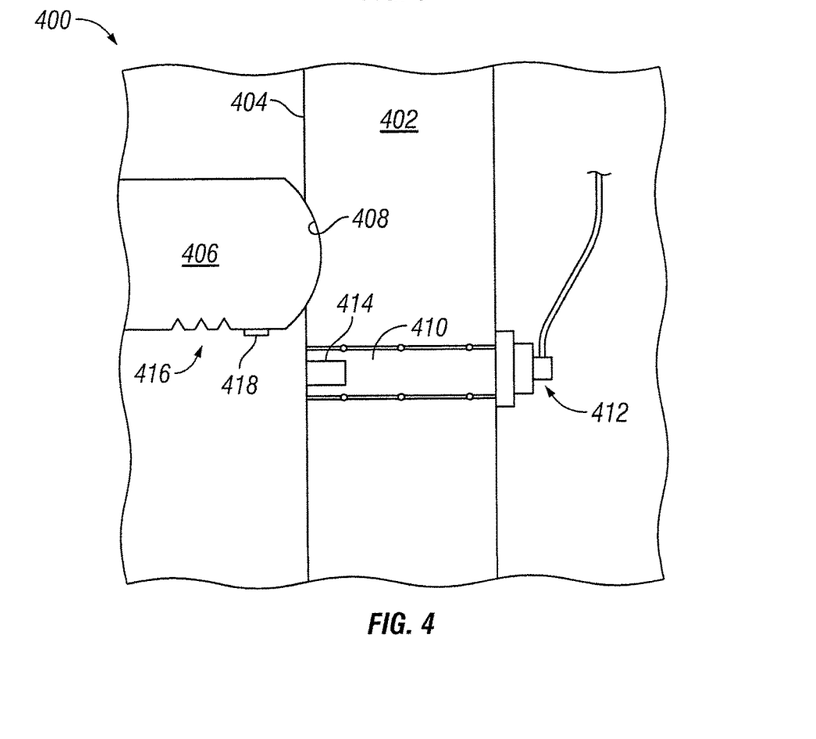
FIG. 4 shows a cross-section elevational view of a blowout preventer and housing including a sensor assembly configured to monitor characteristics of the blowout preventer in accordance with one or more embodiments.

FIG. 4 illustrates a cross-section elevational view of a BOP and housing including a sensor assembly configured to monitor characteristics of the BOP in accordance with one or more embodiments. BOP 400 includes a housing 402 comprising a vertical bore 404. BOP 400 further comprises a ram 406 disposed within a ram cavity 408. Rain 406 can be any type of known BOP ram, such as a shear ram, a pipe ram, a blind ram, or any combination thereof. Rain 406 is configured to move laterally into and out of the vertical bore 404 of the BOP 400. For instance, ram 406 is configured to move from an open position in which the ram is withdrawn from the vertical bore 404 to a closed positioned in which the ram is moved laterally into the vertical bore 404. In FIG. 4, the ram is capable of movement into and out of the page.

BOP housing 402 further includes an access port 410. Access port 410 is similar to access port 312 illustrated in FIG. 3 in that it can be an unused choke/kill port on a BOP housing that is not coupled to an auxiliary line (e.g., a choke or kill line). Access port 410 extends through BOP housing 402 and is located below ram cavity 408.

A sensor assembly 414 is located within the interior of access port 410 and includes one or more sensors to measure one or more characteristics of the BOP 400 and its associated rams (one of which is shown, reference character 406). For instance, sensor assembly 400 can monitor the position of one or both of the rams as they move laterally within the BOP from an open position to a closed position, or vice versa. One way in which sensor assembly 414 can monitor the position of the ram 406 is by visually identifying, with an appropriate sensor e.g., ultrasonic, radio frequency, radar, optical (including lidar), etc., a detection feature or features located on the bottom of ram 406. The use of detection features on the rams will be discussed in greater detail below. Power and communication assembly 412 is connected to the outside of the housing 402 and provides power to the sensor assembly 414 and/or communicates information produced by the sensor assembly 414, such as to a remote location.

In addition to optical sensors for monitoring the position of ram 406, sensor assembly 414 can include one or more sensors for measuring the conditions within the BOP, such as temperature and/or pressure. In one or more embodiments, sensor assembly 414 is located within the interior of access port 410 and adjacent vertical bore 404 so as to have an unimpeded line of sight with the vertical bore 404. In this way, sensor assembly 414 can be equipped with sensors configured to directly monitor the position of ram 406 as it moves within cavity 408. However, sensor assembly 414 could be located anywhere along the interior of access port 410. Optionally, a protective plate of suitable material may be located between the end of the sensor assembly 414 and the opening to the vertical bore 404 to minimize the ingress of wellbore materials into the annular space between the sensor assembly 414 and the access port 410. Suitable materials include, e.g., a polyetherimide material, such as VESPEL™, available from E.I. du Pont de Nemours and Company of Wilmington, Del., ULTEM™, available from SABIC of Saudi Arabia, organic polymer thermoplastic materials, such as polyether ether ketone (PEEK), or a polyimide-based plastic.

Rain 406 may optionally comprise detection features 416 on the lower surface of the ram 406 configured to be detected by sensor assembly 414. Detection features 416 may include visual indicators comprising recesses or recesses arranged in a pattern such that these features are distinguishable by the sensor assembly 414 from the rest of the ram 406 as well as any fluids or debris located in the vertical bore 404 of the BOP 400. Differently shaped detection features may be used on each of the opposed rams in a BOP, thereby differentiating the detection feature located on one ram from the opposed ram. Detection features 416 may take many forms and utilize many profiles and orientations suitable for detection. The ram 406 may further comprise another detection feature such as a radio frequency identification ("RFID") tag 418.

FIGS. 5, 5A, 5B, 6, 6A, and 6B show schematic illustrations of detection features with exemplary profiles and orientations usable according to one or more embodiments.

Figure 5:
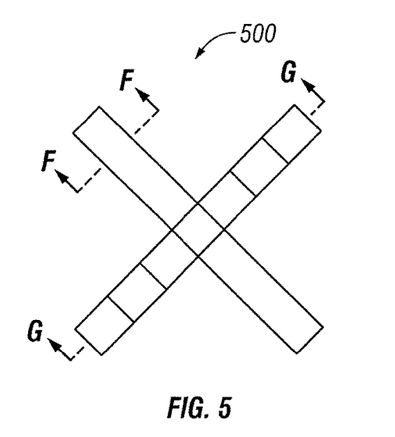
FIG. 5 shows a bottom view of a detection feature generally having a X shape in accordance with one or more embodiments.
Figure 5A:
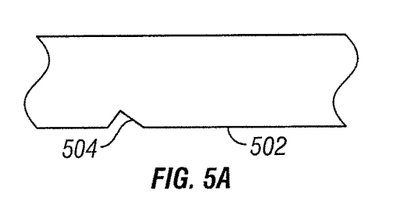
FIG. 5A shows a lower surface of a blowout preventer ram including a recess of a detection feature along section F-F referenced in FIG. 5 in accordance with one or more embodiments.
Figure 5B:
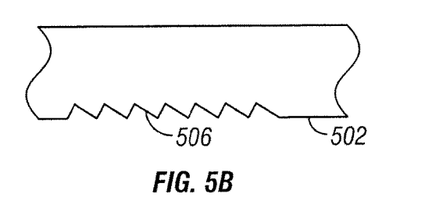
FIG. 5B shows a lower surface of a blowout preventer ram including recesses of a detection feature along section G-G referenced in FIG. 5 in accordance with one or more embodiments.

FIG. 5 shows a bottom view of a detection feature 500 generally having a X shape in accordance with one or more embodiments. FIG. 5A shows a cross-section of a BOP ram 502, such as ram 406 in FIG. 4, including a recess 504 of detection feature 500 along section F-F. Recess 504 is shown having a generally scalene triangle profile extending into the lower surface of ram 502. However, the profile of recess 504 may be any geometrical shape, such as a symmetrical triangle, a square, a semicircle, etc. FIG. 5B shows a cross-section of a BOP ram 502, such as ram 406 in FIG. 4, including recesses 506 of detection feature 500 along section G-G. Recesses 506 are each shown having a generally scalene triangle profile extending into the lower surface of ram 502. However, recesses 506, like recess 504, may include any geometrical shape. Recess 504 and/or recesses 506 may be of any size and shape provided the recesses do not foul the ram cavity when the ram is moved into or out of the BOP bore.

Figure 6:
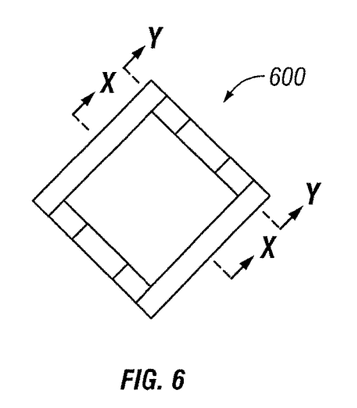
FIG. 6 shows a bottom view of a detection feature 600 generally having a diamond shape in accordance with one or more embodiments.
Figure 6A:
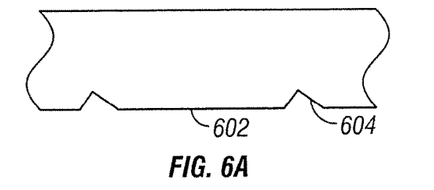
FIG. 6A shows a lower surface of a blowout preventer ram including recesses of a detection feature along section X-X referenced in FIG. 6 in accordance with one or more embodiments.
Figure 6B:
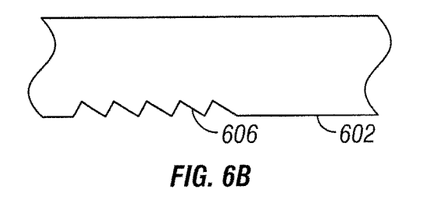
FIG. 6B shows a lower surface of a blowout preventer ram including recesses of a detection feature along section Y-Y referenced in FIG. 6 in accordance with one or more embodiments.

FIG. 6 shows a bottom view of a detection feature 600 generally having a diamond shape in accordance with one or more embodiments. FIG. 6A shows a lower surface of a BOP ram 602, such as a lower surface of ram 406 in FIG. 4, including recesses 604 of detection feature 600 along section X-X. Recesses 604 are each shown having a generally scalene triangle profile extending into the lower surface of ram 602. However, the profile of recesses 604 may be any geometrical shape, such as a symmetrical triangle, a square, a semicircle, etc. FIG. 6B shows the lower surface of a BOP ram 602 including recesses 606 of detection feature 600 along section Y-Y. Recesses 606 are each shown having a generally scalene triangle profile extending into the lower surface of ram 602. However, recesses 606, like recess 604, may include any geometrical shape. Detection features 500 and 600 may be incorporated on the lower surfaces of opposing BOP rams for detection by a sensor assembly located in an unused access port disposed within the BOP housing, such as sensor assembly 414 illustrated in FIG. 4.

Figure 7:
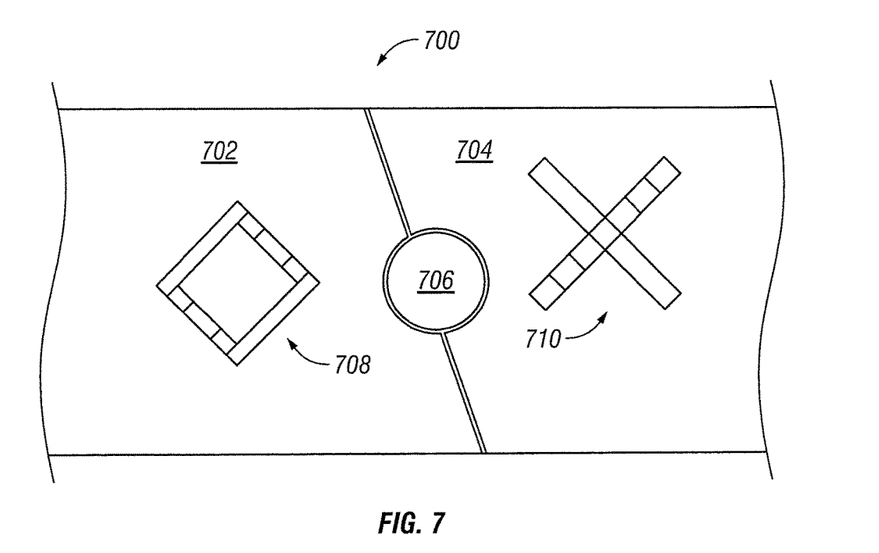
FIG. 7 shows a bottom view of opposing blowout preventer pipe rams each having a detection feature thereon in accordance with one or more embodiments.

FIG. 7 shows a bottom view of opposing BOP pipe rams 700 each having a detection feature thereon, in accordance with one or more embodiments. Opposing BOP rams 700 are located in a BOP (not shown) and include a first ram 702 and a second ram 704. The rams 700 are shown in a closed position, with rams 702 and 704 in sealing engagement around a tubular 706 extending into/out of the page.

Rain 702 includes a detection feature 708 generally having a diamond shape. Detection feature 708 is similar to detection feature 600 illustrated in FIG. 6. Rain 704 includes a detection feature 710 generally having a X shape. Detection feature 710 is similar to detection feature 500 illustrated in FIG. 5. As discussed above, detection features of any geometry may be used according to the disclosure.

Detection features 708 and 710 are detectable by a sensor assembly located in the BOP housing, such as sensor assembly 414 illustrated in FIG. 4. Accordingly, as rams 702 and 704 move laterally within the BOP housing, from an open position to a closed position or vice versa, the sensor assembly is able to track the movement of detection features 708 and 710. In this way, the sensor assembly can monitor the position of the rams 702 and 704. By monitoring the position of the rams 702 and 704, a determination as to the state of the BOP (i.e., open position or closed position) can be made. In addition, the sensor assembly can monitor the speed at which the rams 702 and 704 are closing by monitoring the detection features 708 and 710 over a period of time as the rams 702 and 704 are closing. By monitoring the closing or opening speed of the rams 702 and 704, a determination as to the condition of the BOP (e.g., whether the rams are functioning as expected) can be made.

The processing and interpretation of the monitoring data gathered by the sensor assembly may be handled in a variety of ways. For instance, where the sensor assembly includes a sensor capable of bouncing a signal directly off the ram (e.g., an ultrasonic transducer), a direct calculation of the position of the ram can be made. Where signals are to be bounced off of the ram in order to take measurements, calibration may be required. For instance, the velocity of sound in the fluid may be determined to more accurately determine the position of the ram or rams in the BOP housing. Velocity of sound of the fluid in the bore may be determined (and continuously calibrated) by several techniques, including measuring the time of flight of a reference acoustic signal over a known distance within the apparatus.

Where the sensor assembly includes a sensor capable of recording images of the ram, the images can be reduced to a human or computer readable picture that is passed to a human or to image analysis software for identification of the detection feature(s), allowing for the position of the ram to be determined. Based on these measurement data, the position of each ram can be determined and the state of the BOP (e.g., open, closed, partially open/closed) can be assessed. Where the rams are in a partially open/closed position, the gap between the rams can also be determined.

As discussed above, the sensor assembly can be fitted with one sensor for monitoring the position of the rams and/or measuring characteristics of the BOP. Alternatively, the sensor assembly can include an array of sensors in order to provide, e.g., a greater field of view of the BOP bore, greater measurement accuracy, or to combine a variety of measurements such as ultrasonic, radio frequency, magnetic, inductive, optical, laser, etc.

In some embodiments, one or more of the opposing rams may include radio frequency identification ("RFID") tags located on a lower surface of the ram or rams. In this embodiment, the sensor assembly may be fitted with a transmitter for activating the RFID tags (if passive) and a receiver for receiving signals produced by the RFID tags. If the RFID tags are active, the sensor assembly may only be fitted with a receiver for receiving signals produced by the RFID tags. In this way, the RFID tags can communicate information via the signals indicating the distance between the sensor assembly and RFID tags, from which position of the ram or rams can be determined.

In addition to the embodiments described above, many examples of specific combinations are within the scope of the disclosure, some of which are detailed below:

Example 1

A ram blowout preventer ("BOP") assembly, comprising:
a body comprising a vertical bore extending through the body, a ram cavity intersecting the bore, and a port located below the ram cavity;
a pair of opposing rams movable laterally into and out of the BOP vertical bore; and
a sensor assembly locatable in the port and configured to monitor the position of at least one opposing ram.

Example 2

The assembly of Example 1, wherein each opposing ram comprises a detection feature located on a lower surface of the ram and configured to be detected by the sensor assembly.

Example 3

The assembly of Example 2, wherein the detection feature comprises a visual indicator.

Example 4

The assembly of Example 2, wherein the detection feature comprises a radio frequency identification ("RFID") tag.

Example 5

The assembly of Example 1, wherein the sensor assembly is configured to be calibrated depending on a velocity of sound of a fluid in the vertical bore.

Example 6

The assembly of Example 1, wherein the sensor assembly is configured to monitor the position of each opposing ram during movement of each ram.

Example 7

The assembly of Example 1, further comprising another port configured to provide for fluid communication with the vertical bore.

Example 8

The assembly of Example 7, wherein the another port is a choke or kill port.

Example 9

The assembly of Example 1, comprising multiple sensors located in the port configured to monitor the position of each opposing ram.

Example 10

The assembly of Example 1, where the sensor assembly is powered by a power source local to the blowout preventer assembly.

Example 11

The assembly of Example 1, wherein the opposing rams are each one of a shear ram, a pipe ram, variable-bore ram, blind shear ram, or a blind ram.

Example 12

The assembly of Example 1, wherein the sensor is configured to be retrofitted to the port.

Example 13

A blowout preventer ("BOP") ram comprising:
a detection feature located on a lower surface of the ram, the detection feature configured to be detected by a sensor assembly locatable in a port located below a ram cavity of the BOP.

Example 14

The ram of Example 13, wherein the detection feature comprises a visual indicator.

Example 15

The ram of Example 13, wherein the detection feature comprises a radio frequency identification ("RFID") tag.

Example 16

The ram of Example 13, wherein the sensor is configured to be calibrated depending on a velocity of sound of a fluid in the vertical bore.

Example 17

The ram of Example 13, wherein the sensor assembly is configured to monitor the position of the ram during movement of the ram.

Example 18

The ram of Example 13, wherein the detection feature is retrofittable to the ram.

Example 19

The ram of Example 13, further comprising a plurality of detection features.

Example 20

A method for monitoring the position of opposing rams of a blowout preventer ("BOP"), comprising:
providing a detection feature on a lower surface of each opposing ram;
providing a sensor assembly in a port located in the blowout preventer below the opposing rams, the sensor configured to identify the position of each detection feature;
moving the opposing rams towards each other; and
monitoring the position of the opposing rams using the sensor assembly by detecting the detection feature on each opposing ram.

This discussion is directed to various embodiments of the present disclosure. The drawing figure is not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Certain terms are used throughout this description and claims to refer to particular features or components. As one skilled in the art will appreciate, different persons may refer to the same feature or component by different names. This document does not intend to distinguish between components or features that differ in name but are the same structure or function. The drawing figure is not necessarily to scale. Certain features and components herein may be shown exaggerated in scale or in somewhat schematic form and some details of conventional elements may not be shown in interest of clarity and conciseness.

In this discussion and in the claims, the terms "including" and "comprising" are used in an open-ended fashion, and thus should be interpreted to mean "including, but not limited to . . . ."

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A ram blowout preventer ("BOP") assembly, comprising:
   a body comprising a vertical bore extending through the body, a ram cavity intersecting the vertical bore, and a port extending through the body from the vertical bore;
   a pair of opposing rams movable laterally into and out of the vertical bore from the ram cavity;
   a sensor assembly located in the port and near the vertical bore and configured to monitor the position of at least one opposing ram and;
   wherein the at least one opposing ram comprises a detection feature located on a surface of the at least one opposing ram and configured to be detected by the sensor assembly.

2. The assembly of claim 1, wherein the at least one opposing ram comprises a detection feature located on a surface of the at least one opposing ram and configured to be detected by the sensor assembly.

3. The assembly of claim 1, wherein the detection feature comprises a plurality of recesses formed in the surface.

4. The assembly of claim 1, wherein the at least one opposing ram comprises a detection feature configured to be detected by the sensor assembly, and the detection feature comprises a radio frequency identification ("RFID") tag.

5. The assembly of claim 1, wherein the sensor assembly is configured to monitor the position of each ram of the pair of opposing rams during movement of each ram.

6. The assembly of claim 1, wherein the port comprises a choke or kill port that is configured to couple to an auxiliary line to provide for fluid communication between the auxiliary line and the vertical bore.

7. The assembly of claim 1, comprising multiple sensors located in the port and configured to monitor the position of each ram of the pair of opposing rams.

8. The assembly of claim 1, wherein the pair of opposing rams are each one of a shear ram, a pipe ram, a variable-bore ram, a blind shear ram, or a blind ram.

9. The assembly of claim 1, wherein the sensor assembly is configured to be retrofitted to the port.

10. The assembly of claim 1, wherein the port is located below the ram cavity and the detection feature is located on a lower surface of the at least one opposing ram.

11. The assembly of claim 1, wherein an axis of the port is perpendicular to a ram cavity axis of the ram cavity.

12. The assembly of claim 1, wherein the sensor assembly is configured to monitor the position of the at least one opposing ram by detecting the detection feature within the vertical bore.

13. The assembly of claim 1, wherein the sensor assembly comprises an ultrasonic sensor, radio frequency sensor, optical sensor, or some combination thereof.

* * * * *